United States Patent
Era et al.

(10) Patent No.: US 7,919,728 B2
(45) Date of Patent: Apr. 5, 2011

(54) WELDING CURRENT CONTROLLING METHOD IN ARC WELDING PROCESS USING CONSUMABLE ELECTRODE UPON DETECTION OF CONSTRICTION

(75) Inventors: Tetsuo Era, Osaka (JP); Akihiro Ide, Osaka (JP)

(73) Assignee: DAIHEN Corporation, Osaka (JP)

( * ) Notice: Subject to any disclaimer, the term of this patent is extended or adjusted under 35 U.S.C. 154(b) by 1084 days.

(21) Appl. No.: 11/370,760

(22) Filed: Mar. 8, 2006

(65) Prior Publication Data
US 2006/0201922 A1 Sep. 14, 2006

(30) Foreign Application Priority Data
Mar. 11, 2005 (JP) ................. 2005-068360

(51) Int. Cl.
*B23K 9/10* (2006.01)
*B23K 9/06* (2006.01)

(52) U.S. Cl. ............ 219/130.21; 219/130.4; 219/130.5; 219/130.51; 219/137 PS

(58) Field of Classification Search ............ 219/130.21, 219/130.51, 137 PS
See application file for complete search history.

(56) References Cited

U.S. PATENT DOCUMENTS

| | | | |
|---|---|---|---|
| 4,544,826 A | 10/1985 | Nakanishi et al. | |
| 4,546,234 A | 10/1985 | Ogasawara et al. | |
| 4,866,247 A * | 9/1989 | Parks et al. ............. | 219/137 PS |
| 6,087,626 A * | 7/2000 | Hutchison et al. ....... | 219/130.21 |
| 7,304,269 B2 * | 12/2007 | Fulmer et al. ............ | 219/130.51 |
| 2003/0080101 A1 * | 5/2003 | Flood et al. ............. | 219/130.21 |
| 2006/0207983 A1 * | 9/2006 | Myers et al. ............ | 219/137 PS |

FOREIGN PATENT DOCUMENTS

| | | | |
|---|---|---|---|
| JP | 59-206159 | | 11/1984 |
| JP | 60-108179 | | 6/1985 |
| JP | 03094977 A | * | 4/1991 |

* cited by examiner

*Primary Examiner* — Stephen J Ralis
(74) *Attorney, Agent, or Firm* — Hamre, Schumann, Mueller & Larson, P.C.

(57) ABSTRACT

A welding current controlling method is provided for an arc welding process using a consumable electrode and including an alternate repetition of a short-circuiting state and an arc generating state occurring between the consumable electrode and a base material. In the method, a neck detection is performed for the molten electrode in the short-circuiting period of time to determine if a new arc is established between the consumable electrode and the base material. Upon detection of the neck, the welding current is sharply decreased. After the new arc is established, the welding current is increased from a low level to a high level with a predetermined inclination selected for reducing vibration to the molten pool.

3 Claims, 6 Drawing Sheets

WELDING CURRENT CONTROLLING METHOD IN ARC WELDING PROCESS USING CONSUMABLE ELECTRODE UPON DETECTION OF CONSTRICTION

BACKGROUND OF THE INVENTION

1. Field of the Invention

The present invention relates to an arc welding process using a consumable electrode. In particular, the present invention relates to a welding current controlling method for reducing the spattering of molten metal by sharply decreasing the welding current immediately before a new arc is established.

2. Description of the Related Art

FIG. 5 illustrates a conventional arc welding process using a consumable electrode or welding wire. The figure includes a diagram showing waveforms of welding current Iw and welding voltage Vw, while also including a diagram showing the metal transfer of the welding wire in a plastic state. As seen from the figure, the welding process comprises an alternate repetition of a short-circuiting time or period Ts and an arc generating time or period Ta.

More specifically, Waveform (A) in FIG. 5 shows the change of the welding current Iw with time (the current Iw passes through the welding wire 1), while Waveform (B) shows the change of the welding voltage Vw with time (the voltage Vw is applied between the contact-tip for power supply and the base material 2). Graphics (C) through (E) illustrate the shape-shifting of the molten wire end or droplet 1a.

The short-circuiting period Ts, which ranges from time instant t1 to t3, is a stage where the molten droplet 1a at the tip of the welding wire 1 comes into contact with the base material 2, thereby establishing a short-circuiting state.

During the period Ts, the welding current Iw gradually increases, as shown in Waveform (A), while the short-circuiting state keeps the welding voltage Vw at a low level, such as a few of volts, as shown in Waveform (B).

The short-circuiting period Ts starts at time instant t1 when the molten droplet 1a contacts with the base material 2, as illustrated in Graphic (C). Subsequently, as illustrated in Graphic (D), the welding current Iw passes through the molten droplet 1a, and this produces an electromagnetic pinch force to cause the molten droplet 1a to deform or "neck down" at an upper portion or constriction 1b. Then as illustrated in Graphic (E), the constriction 1b is narrowed rapidly to cause the molten droplet 1a to be disconnected from the end of the welding wire 1 and to drop into the molten pool 2. Upon this, a new arc 3 is generated (this is referred to as "regeneration of arc" or "arc regeneration" below).

Next, the transition from the short-circuiting period Ts to the arc generating period Ta is described.

The period of time from the generation of the constriction to the arc regeneration is very short, such as, a few hundreds of microseconds. Therefore, the detection of a constriction makes it possible to tell the short-circuiting stage is to finish soon.

The detection of a constriction can be performed by monitoring the change in resistance between the welding wire 1 and the base material 2 during the short-circuiting period Ts. A generated constriction narrows the flow path for the welding current Iw, increasing the resistance of the constricted part. The more the part constricted, the more the resistance rises. Thus, to detect a constriction, the change of the resistance is calculated by dividing the welding voltage Vw by the welding current Iw to be monitored.

The way of detection can be more simplified with some approximation. As the first way of simplified detection, change of welding voltage Vw is just monitored instead of the resistance because the above-mentioned time frame, during which the constriction exists, is extremely short enough to ignore the change of the welding current Iw during the time frame as shown in Waveform (A). The detection of a constriction is performed by, first, calculating the rate-of-change (i.e. differential) of the resistance or the welding voltage Vw in the short-circuiting period Ts, and then, checking if the calculated rate-of-change reaches a predetermined value or threshold for necking detection.

As the second way of simplified detection, the detection of a neck is performed by acquiring a voltage increment $\Delta V$ in Waveform (B) from the stable short-circuiting voltage Vs, which can be obtained in the short-circuiting period Ts except the period after the constriction generates. Then, it is checked if the voltage increment $\Delta V$ reaches a predetermined neck detecting value or threshold Vtn at time instant t2.

The description below is made for the second detection method of a constriction. However, the first method or other detection methods may be employed for detecting a constriction.

At the end of the transition, it is required to detect regeneration of an arc at time instant t3. The detection of arc regeneration is simply performed by monitoring if the welding voltage Vw exceeds the judgmental boundary voltage Vta, which separates an arc generating stage from a short-circuiting stage. Specifically, if Vw<Vta holds, this indicates the short-circuiting period Ts. On the other hand, if Vw≧Vta holds, this indicates the arc generating period Ta. Hereinafter, the above-mentioned period of time from the time instant t2 (at which the generation of the constriction occurs) to the time instant t3 (at which the arc regeneration occurs) is referred to as "neck detecting period Tn".

Referring to the last half period of FIG. 5, the arc generation period Ta, which starts at the time instant t3, is a stage where arc heat melts the tip of the welding wire 1 to produce a molten droplet 1a and also melts the base material 2. At the time instant t3, the welding current Iw starts to gradually decrease as shown in Waveform (A), whereas the welding voltage Vw surges to an arc generating voltage of around a few tens of volts as shown in Waveform (B).

Generally, an arc welding process using a consumable electrode employs a constant-voltage power source for welding. Further, the arc welding can be divided into two modes: a short-circuiting transfer, which occurs when the average value of welding current (or wire feeding speed) is low, and a globular transfer, which occurs when the average value of welding current is high.

In performing welding process with the short-circuiting state, the current value Ia at the time instant t3, at which an arc is re-generated, tends to become large. This causes large growth of the pressure (i.e. arc force) produced by the arc 3 to the molten pool 2a, resulting in generation of a large amount of spatter. The amount of generated spatter is substantially proportional to the welding current value Ia at the moment of arc regeneration. Thus, for prevention of spatter generation, the welding current need be set to a small value Ia at the moment of arc regeneration. Conventionally, various methods have been proposed to restrict the welding current value Ia at the moment of arc re-generating, including some methods by detecting a constriction and subsequent decreasing the welding current Iw sharply. Such conventional welding current controlling methods will be described below.

FIG. 6 shows an example of above-mentioned conventional welding current controlling methods employed in an arc welding process using a consumable electrode in order to restrict generation of spatter. The figure is a block diagram of a power source which the method employs to utilize its current control function upon detecting a constriction. It should be noted that blocks for wire feeding are omitted from the figure.

The power source main circuit MC receives commercial power supply such as three-phase alternating current with 200V as input, then executes some processing, such as inverter control or phase control using thyristors, based on the amplified error signal Ea which will be described later, and finally outputs the output voltage and the welding current Iw.

The current path for the welding current Iw includes a transistor TR and a resistor R which are inserted parallel to each other in order to control the current. At the moment that a constriction or neck is detected, as described later, the transistor TR turns off while the resistor R only permits the current to pass through and thus the welding current Iw is reduced sharply. The welding wire 1 is fed at a constant speed to generate an arc 3 with the base material 2.

The neck detecting circuit ND receives the welding voltage Vw as an input, detects a constriction by the method described, and then outputs the neck detection signal Nd, which keeps LOW-level during the neck detecting period Tn.

The driver circuit DR outputs the driving signal Dr, which turns the transistor TR Off only while the neck detection signal Nd is LOW-level. This operation enables the resistor R to function whereby the current path for the welding current Iw has an increased resistance more than ten times as large, resulting in sharp reduction of the welding current Iw. In periods except the neck detecting period Tn, the transistor TR is kept on and then makes the resistor R short-circuited, causing the power source in the default configuration.

The delay period setting circuit TDR outputs the delay period setting signal Tdr which is predetermined.

The uprise period setting circuit TUR outputs the uprise period setting signal Tur which is predetermined.

The first current level setting circuit IMR outputs the first current level setting signal Imr which is predetermined.

The second current level setting circuit IHR outputs the second current level setting signal Ihr which is predetermined.

The current controller NIC, which controls the current upon detection of a constriction, receives the above-mentioned signals Tdr, Tur, Imr, Ihr and Nd, each as an input, and outputs the switching signal Sw for power characteristics and the current setting signal Ir, both of which are described later with reference to FIG. 7.

The voltage setting circuit VR outputs the voltage setting signal Vr which is predetermined.

The current detecting circuit ID monitors the welding current Iw and outputs the current detection signal Id.

The voltage detecting circuit VD monitors the output voltage and outputs the voltage detection signal Vd.

The voltage-error amplifier EV amplifies the error between the voltage setting signal Vr and the voltage detection signal Vd, and then outputs the amplified voltage-error signal Ev.

The current-error amplifier EI amplifies the error between the current setting signal Ir and the current detection signal Id, and then outputs the amplified current-error signal Ei.

By using the switching circuit SW, it is possible to change the characteristics of the power source between two modes or two periods. The first one is a current-constant period, in which the circuit SW selects "a"-terminal path, that is a stage where the power source has current-constant characteristics. The second one is a voltage-constant period, in which the circuit SW selects "b"-terminal path, that is a stage where the power source has voltage-constant characteristics.

More specifically, the above-mentioned switching for power characteristics is performed by the switching circuit SW based on the switching signal Sw as an input. As described later with reference to FIG. 7, during the neck detecting period Tn, the delay period Td, and the uprise period Tu, the switching signal Sw causes the switching circuit SW to select "b"-terminal path, and hence select the amplified current-error signal Ei. On the contrary, during periods except the above-mentioned, the switching signal Sw causes the switching circuit SW to select "a"-terminal path, and hence outputs the amplified voltage-error signal Ev. Thus, the switching circuit SW outputs the selected one of the two signals as the amplified error signal Ea.

FIG. 7 is a timing chart concerning several signals in the power source shown in FIG. 6. Waveforms (A), (B), (C), (D), and (E) illustrate time change of the welding current Iw, the welding voltage Vw, the neck detection signal Nd, the switching signal Sw for power characteristics, and the current setting signal Ir, respectively. More details will be described below with reference of the figure.

In the figure, the current-constant period ranges from time instant t2 to t5. The rest is the voltage-constant period, where the waveforms of current and voltage are the same as the default ones shown in FIG. 5 with the transistor TR in an ON-state as described above.

At the time instant t2, the voltage increment ΔV reaches the neck detecting threshold Vtn as shown in Waveform (B), causing the neck detection signal Nd to turn LOW-level as shown in Waveform (C). This results in LOW-level of the switching signal Sw for power characteristics. At the same time, LOW-level of Nd turns off the transistor TR, causing the welding current Iw to reduce sharply as shown in Waveform (A) to the first current level Im, which is relatively low, indicating the generation of a constriction.

At the time instant t3, an arc is re-generated, causing the welding voltage Vw to reach the judgmental boundary voltage Vta, which separates an arc generating stage from a short-circuiting stage, as shown in Waveform (B). This results in return of the neck detection signal Nd to HIGH-level as shown in Waveform (C).

Generally, large welding current can generate spatter. Therefore, when an arc is re-generated, restricting the welding current can eliminate generation of spatter by the weakened arc force at droplet transfer. In addition, generally, spatter can be generated by resonance of the molten pool with change of arc force produced by change of the current. Therefore, when the molten pool is vibrating by droplet transfer, it is also effective for spatter elimination to wait for the vibration to be attenuated before increasing the welding current again.

For these reasons, in order to restrict generation of spatter, the delay period Td is provided preliminarily from time instant t3 to t4. The period is typically set less than 1 ms, depending on the welding condition.

During the delay period, the welding current Iw is kept to the first current level Im, which is relatively low, as shown in Waveform (A). This is performed by that the first current level setting signal Imr defines a value, and the value is set to the current setting signal Ir then Ir=Im is satisfied during the delay period Td as shown in Waveform (E).

At time instant t4, at which the delay period Td ends, the current setting signal Ir surges to a value which the second current level setting signal Ihr defines, as shown in Waveform (E). Ir keeps the value Ihr during the uprise period Tu, which ranges from time instant t4 to t5. During the period, the switching signal Sw keeps LOW-level as shown in Waveform (D), enabling the welding current Iw to surge to the second current level Ih, which is relatively high and indicates the arc generation, as shown in Waveform (A).

At time instant t5, the switching signal Sw turns HIGH-level as shown in Waveform (D), switching the power source characteristics to constant-voltage. Operations after time instant t5 are the same as operations in FIG. 5, and therefore further explanations are not given.

The above-described conventional methods are disclosed in JP-A-S59-206159 gazette and JP-A-H4-4074 gazette.

The conventional welding current controlling method, described above with reference to FIG. 7, has some disadvantages.

Firstly, it includes sharp surge of the welding current Iw at the time instant t4, which is the end of the delay period Td following an arc regeneration. This current surge causes rapid change of arc force, resulting in intense vibration in the molten pool to generate spatter. Secondly, the vibration in the molten pool may cause the tip of the wire to make contact with the molten pool, resulting in accidental occurrence of short-circuiting again. Different from normal and stable short-circuiting, this kind of accidental short-circuiting is unstable and cause to generate spatter easily.

In order to restrict generation of spatter, the above-mentioned current controlling method upon detecting of a constriction employs special circuit configuration which costs high. Therefore high performance which is worth with the high cost is required to prevent a constriction from generating.

SUMMARY OF THE INVENTION

The present invention has been proposed under the circumstances described above. Accordingly, it is an object of the present invention to provide a welding current controlling method in an arc welding process using a consumable electrode upon detection of a constriction, restricting generation of spatter produced by sharp surge of the welding current after an arc regeneration.

According to the present invention, there is provided a welding current controlling method in an arc welding process using a consumable electrode. The arc welding process includes an alternate repetition of a short-circuiting state and an arc generating state occurring between the consumable electrode and a base material. The welding current controlling method comprises the steps of: detecting a generation of a constriction in a molten droplet produced from the consumable electrode in the short-circuiting state, the detection being based on a change in one of a voltage or a resistance between the consumable electrode and the base material; reducing sharply a welding current between the consumable electrode and the base material to a relatively low first current level upon detection of the constriction; and increasing the welding current from the first current level to a relatively high second current level when an arc is generated between the consumable electrode and the base material with the welding current held at the first current level, the increasing of the welding current being started instantly upon generation of the arc or with a predetermined delay after the generation of the arc. The step of increasing the welding current from the first current level to the second current level is performed with a predetermined inclination applied in changing the welding current in order to reduce vibration to a molten pool produced in the arc welding process.

Preferably, the step of increasing the welding current from the first current level to the second current level may comprise a first stage and a second stage following the first stage, where the first stage and the second stage adopt different inclinations applied in changing the welding current.

Preferably, the inclination adopted at the first stage in changing the welding current is smaller than the inclination adopted at the second stage when an average welding current falls in a range that allows short-circuiting transfer to occur.

Preferably, the inclination adopted at the first stage in changing the welding current is greater than the inclination adopted at the second stage when an average welding current falls in a range that allows globular transfer to occur.

According to the first aspect of the present invention, change in arc force becomes gradual with a predetermined inclination of time change of the welding current increasing from a relatively low first current level to a relatively high second current level after arc regeneration. This restricts vibration in the molten pool, reducing generation of spatter produced by the vibration of the molten pool. Also, this prevents accidental short-circuiting from occurring at the moment immediately after arc regeneration.

By adopting different inclinations at the first stage and the second stage, the characteristics of the inclination is optimized to suit with the welding condition, further reducing generation of spatter.

The change in arc force may become more gradual when an average welding current falls in a range that allows short-circuiting transfer to occur, by setting the inclination adopted at the first stage smaller than the inclination adopted at the subsequent second stage, further reducing generation of spatter.

Further, according to the present invention, increment in wire melting speed is achieved as well as gradual change in arc force, when an average welding current falls in a range that allows globular transfer to occur, by setting the inclination adopted at the first stage is larger than the inclination adopted at the second stage.

More specifically, large inclination of time change of the welding current at the first stage causes increased wire melting speed to produce balance with high wire feeding speed, whereas small inclination at the second stage produces gradual change in arc force, then achieving both of stable welding condition and restricted generation of spatter.

Other features and advantages of the present invention will become apparent from the detailed description given below with reference to the accompanying drawings.

DETAILED DESCRIPTION OF THE PREFERRED EMBODIMENT

Figure 7:
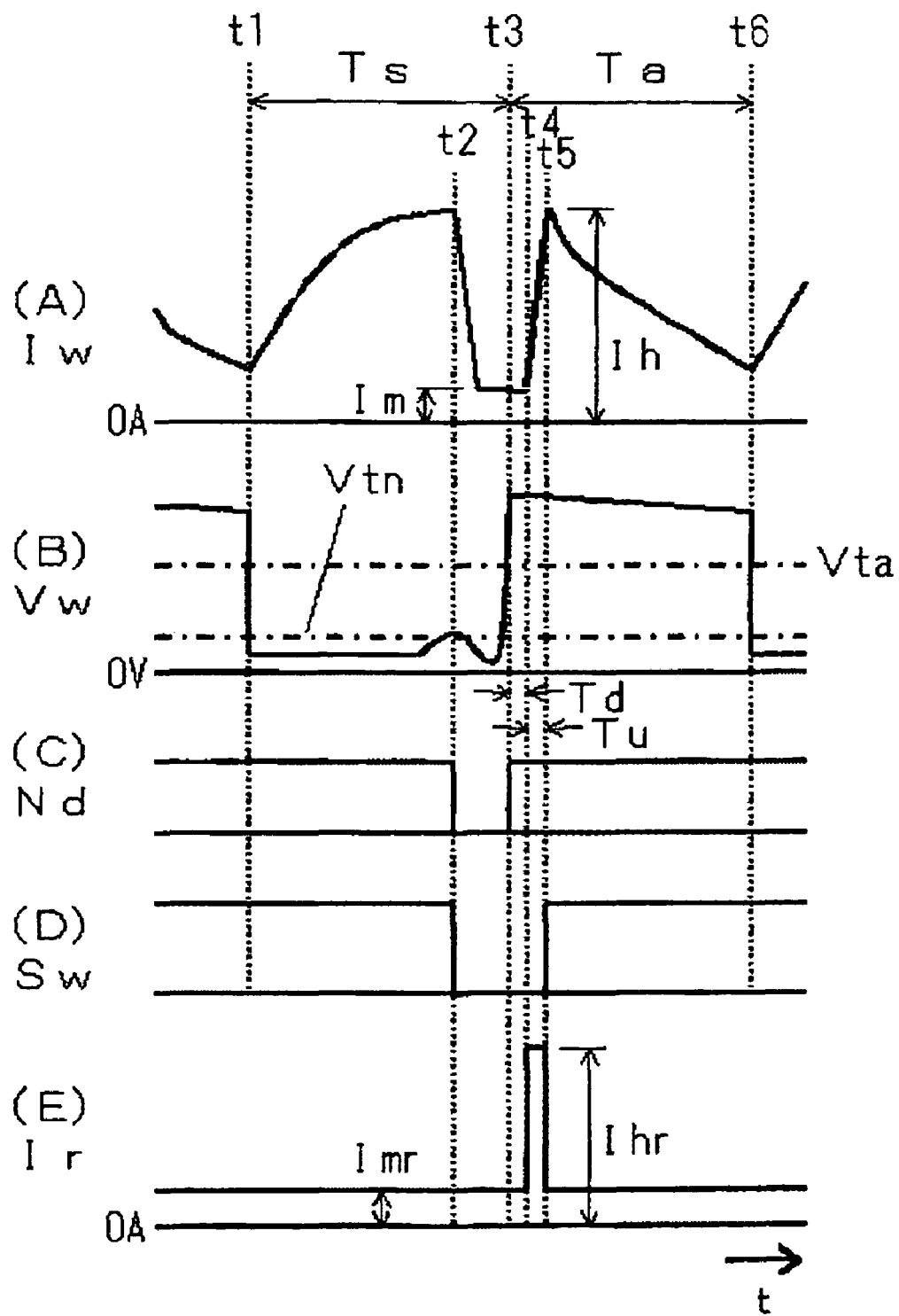
FIG. 7 is a timing chart about the signals in the power source for welding shown in FIG. 6.

According to the first embodiment of the present invention, the welding current is increased with a predetermined inclination during the uprise period which starts after the delay period beginning with an arc regeneration. The inclination S falls approximately in a range from 20 to 100 [A/100 µs]. For comparison, the conventional method described above with reference to FIG. 7, which does not include controlling of the inclination S, has a current rise of 200 [A/100 µs], which is determined by inductance and resistance of the current path. Hereunder, the first embodiment will be described in more detail.

Figure 1:
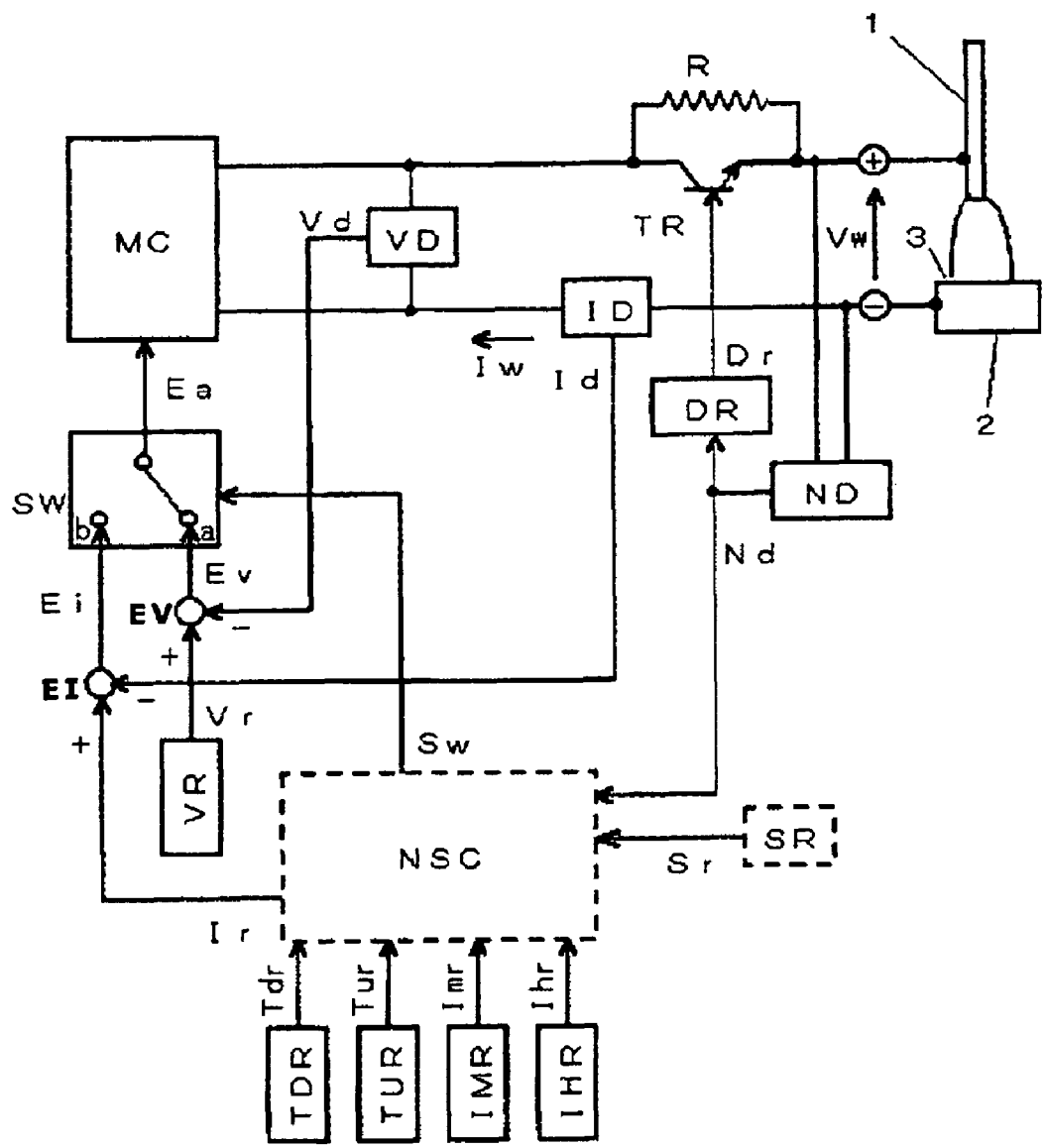
FIG. 1 is a block diagram of a power source for a welding current controlling method in an arc welding process using a consumable electrode upon detection of a constriction according to the present invention.
Figure 6:
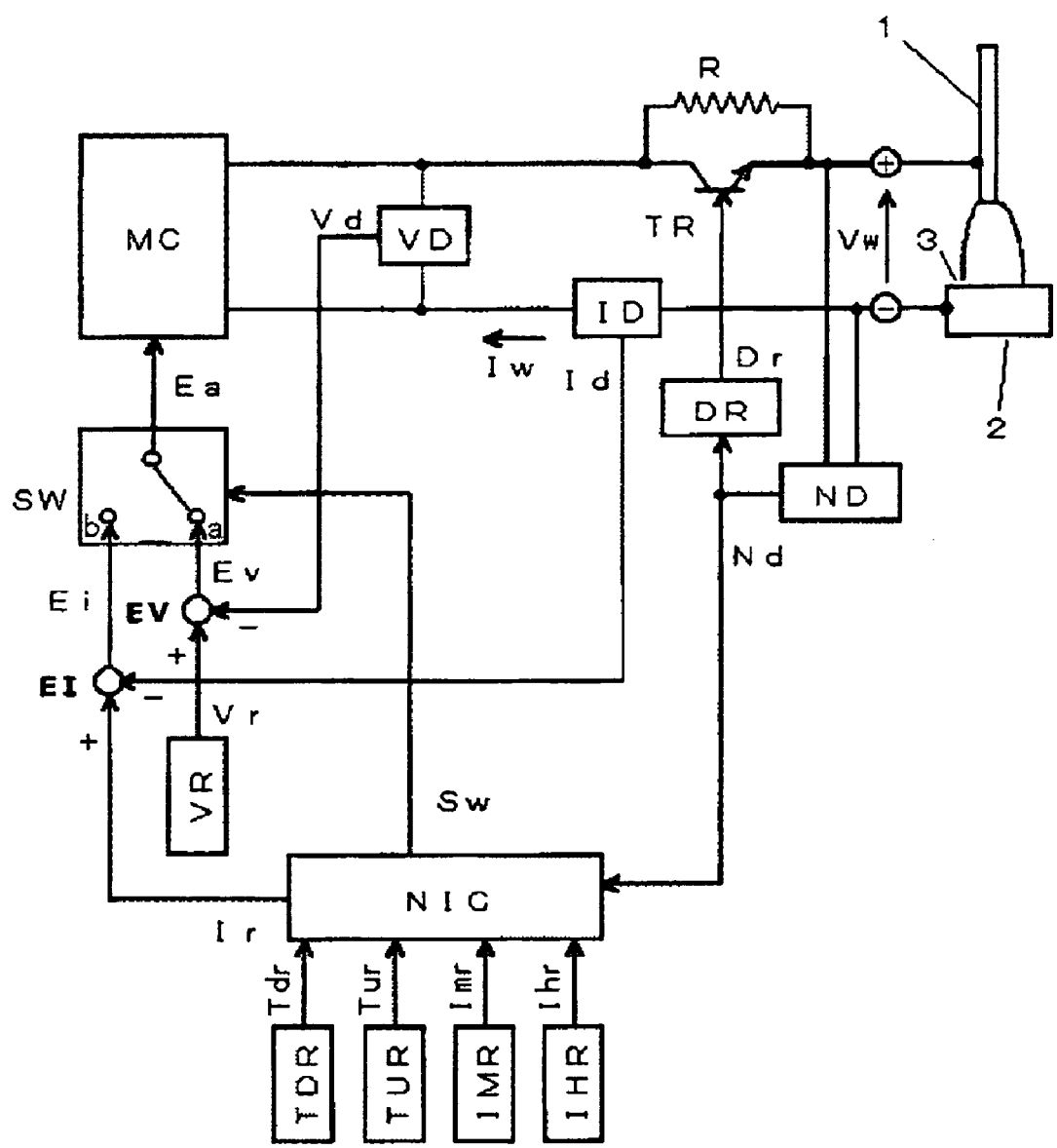
FIG. 6 is a block diagram of a power source for a conventional welding current controlling method in an arc welding process using a consumable electrode upon detection of a constriction.

FIG. 1 is a block diagram of a power source for a welding current controlling method in an arc welding process using a consumable electrode upon detection of a constriction according to the first embodiment of the present invention. In the figure, blocks identical to those in the above-described conventional method shown in FIG. 6 are given the same reference numbers and no description is made. The blocks different from FIG. 6 are drawn with dashed lines in FIG. 1, and will be described below.

The inclination setting circuit SR outputs the inclination setting signal Sr. The current inclination controller NSC, which provides time change of current with an inclination upon detection of a constriction, receives the delay period setting signal Tdr, the uprise period setting signal Tur, the first current level setting signal Imr, the second current level setting signal Ihr, the neck detection signal Nd, and the inclination setting signal Sr, and outputs the switching signal Sw for power characteristics and the current setting signal Ir, both of which are described below with reference to FIG. 2.

Figure 2:
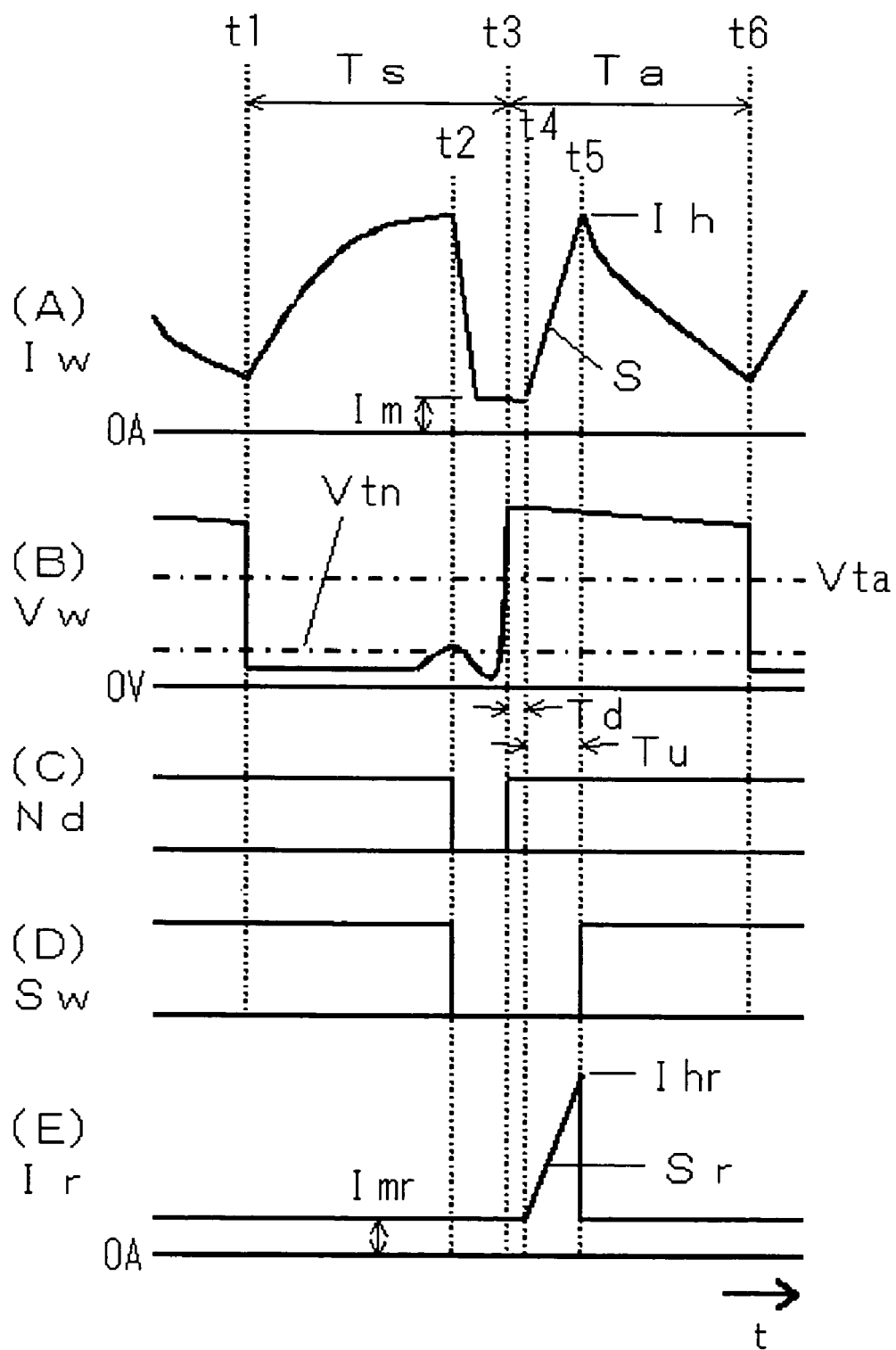
FIG. 2 is a timing chart about the signals in the power source for welding shown in FIG. 1.

FIG. 2 is a timing chart about the signals in the power source for welding shown in FIG. 1. In the figure, Waveform (A), (B), (C), (D), and (E) illustrate time change of the welding current Iw, the welding voltage Vw, the neck detection signal Nd, the switching signal Sw for power characteristics, and the current setting signal Ir, respectively. The periods except the uprise period Tu ranging from time instant t4 to t5 provides the same operations as those in FIG. 7 as described above, and hence are not further described. The uprise period Tu will be described below.

At time instant t3, a new arc is generated. At time instant t4, at which the delay period Td ends, as shown in Waveform (E), the current setting signal Ir starts to rise from the first current level setting signal Imr to the second current level setting signal Ihr with an inclination defined by the inclination setting signal Sr. In response, as shown in Waveform (A), the welding current Iw starts to rise from the first current level Im with the predetermined inclination S and then reaches the second current level Ih at time instant t5.

The uprise period Tu ranging from t4 to t5 occupies approximately 0.2 to 2.0 ms. The first current level Im is about a few tens of amperes. The second current level Ih is about a few hundreds of amperes.

As described above, by setting a predetermined inclination Sw to the increment of the welding current Iw, the change of arc force become gradual rather than sharp. This restricts vibration produced by arc force in the molten pool, reducing generation of spatter produced by vibration.

According to the second embodiment of the present invention, the inclination of time change of the welding current has different values at the first stage and the second stage of the uprise period which starts after the delay period beginning with an arc regeneration. In this embodiment, the inclination may change continuously along a curve or change in a step-like manner.

Figure 3:
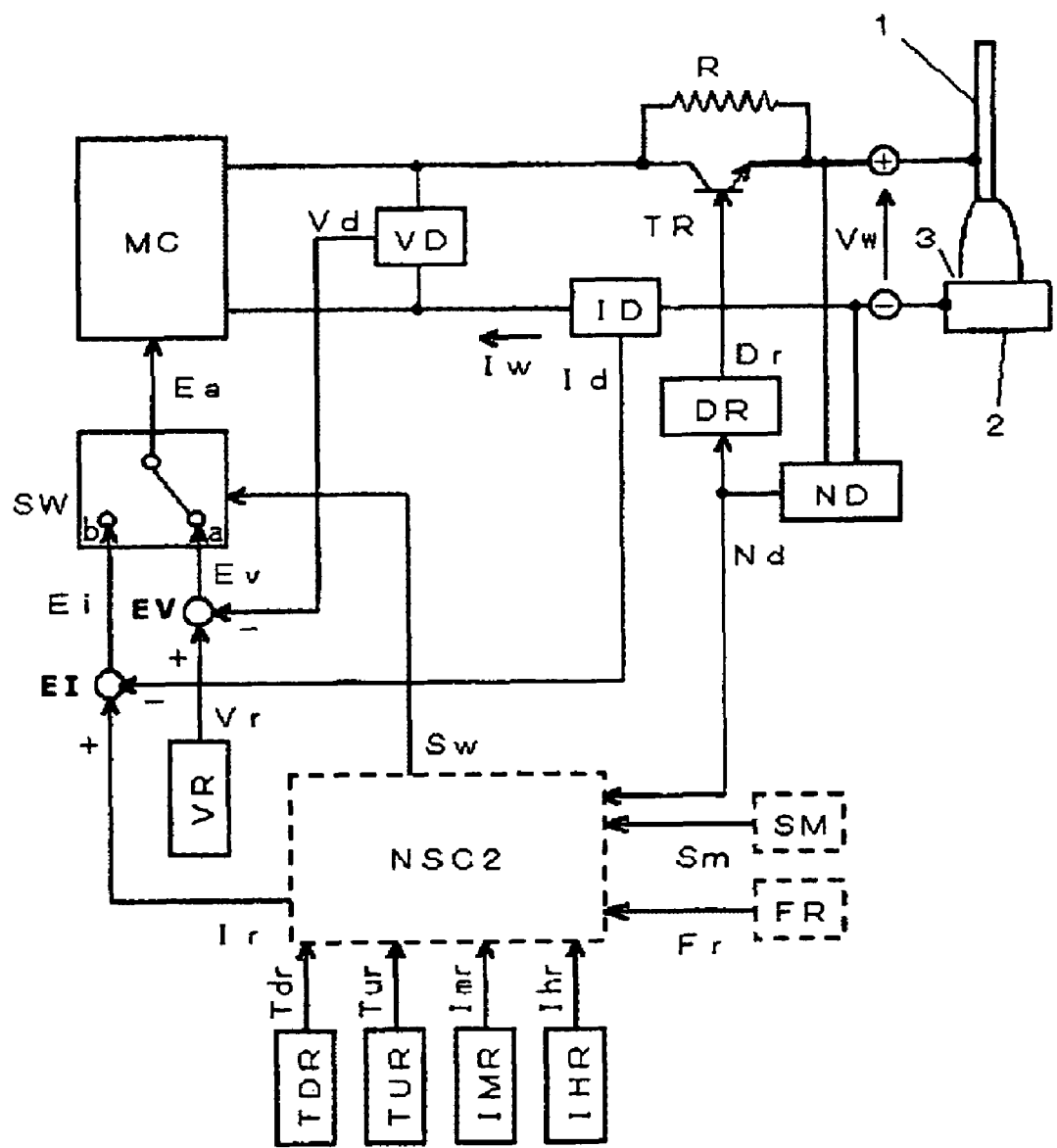
FIG. 3 is a block diagram of a power source for a welding current controlling method in an arc welding process using a consumable electrode upon detection of a constriction according to the present invention.

FIG. 3 is a block diagram of a power source for a welding current controlling method in an arc welding process using a consumable electrode upon detection of a constriction according to the second embodiment of the present invention. In the figure, blocks identical to those in the above-described first embodiment in FIG. 1 are given the same reference numbers and no duplicated description. The blocks different from FIG. 1 are drawn with dashed lines in FIG. 3, and will be described below.

The inclination trajectory memorizing circuit SM outputs the trajectory memorizing signal Sm.

The wire feeding speed setting circuit FR outputs the wire feeding speed setting signal Fr, which sets the feeding speed of the welding wire 1.

Figure 4:
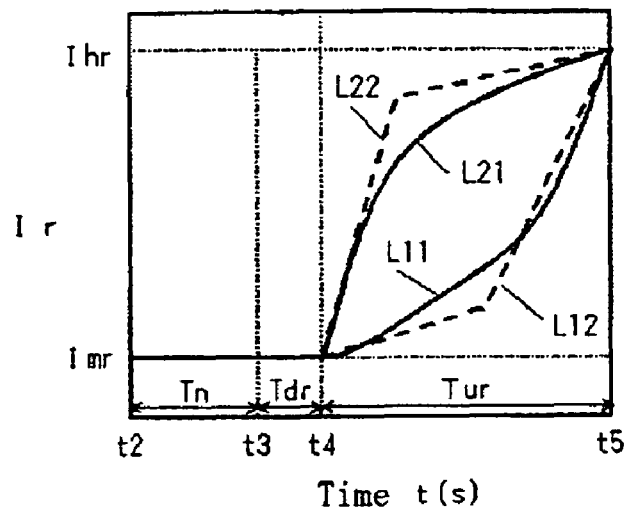
FIG. 4 is a timing chart about the signals in the power source for welding shown in FIG. 3.
Figure 5:
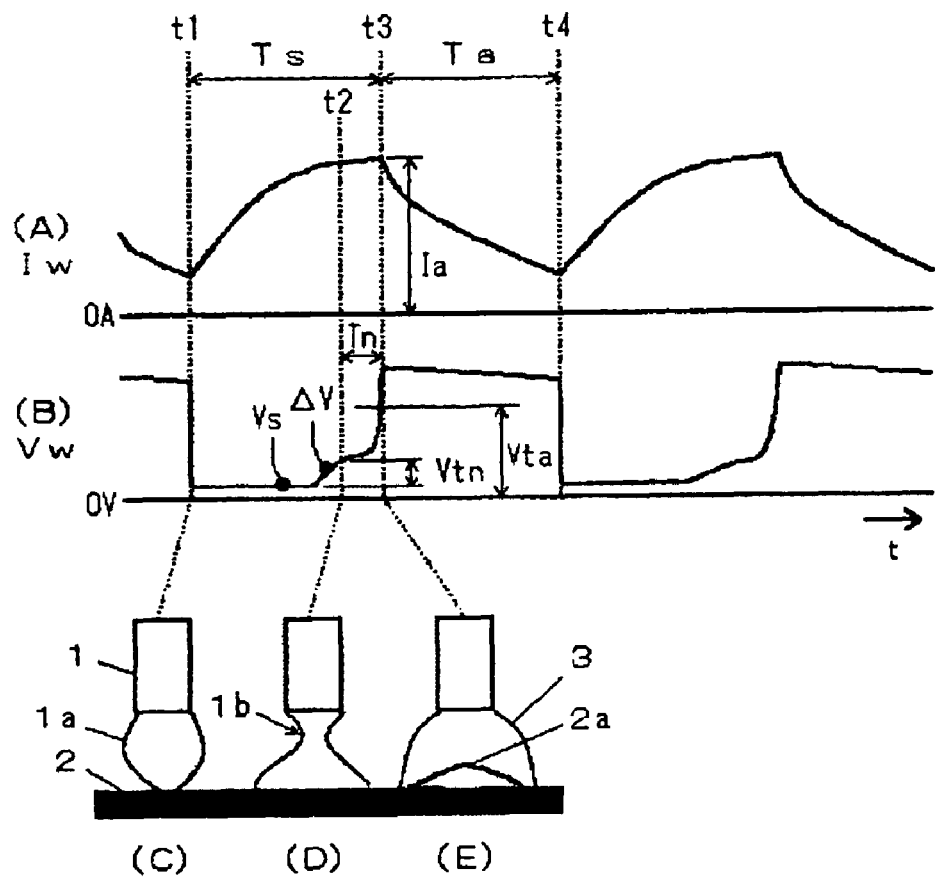
FIG. 5 shows waveforms of current and voltage in a conventional arc welding process with a consumable electrode employing a short-circuiting stage.

The second type of current inclination controller NSC2, which provides time change of current with an inclination upon detection of a constriction, receives the delay period setting signal Tdr, the uprise period setting signal Tur, the first current level setting signal Imr, the second current level setting signal Ihr, the neck detection signal Nd, the inclination setting signal Sr, and the wire feeding speed setting signal Fr, each as an input, and outputs the switching signal Sw for power characteristics and the current setting signal Ir, both of which are described below with reference to FIG. 4.

The power source shown in FIG. 3 includes signals whose waveforms are identical to those of the FIG. 2 as described above except during the uprise period Tu ranging from time instant t4 to t5. During the uprise period Tu, the waveforms change as shown in FIG. 4, where the inclination S of the welding current Iw is not constant but varies continuously or step-like.

FIG. 4 shows time change of the current setting signal Ir during the period of constant-current characteristics ranging from time instant t2 to t5. In the figure, the current setting signal Ir is on the same level as the first current level setting signal Imr, i.e. Ir=Imr, during the neck detecting period Tn ranging from t2 to t3, and also during the delay period Td ranging from t3 to t4. During the uprise period Tu from t4 to t5, however, the current setting signal It takes the shape either of curving or broken lines including L11 through L22 etc. That is, the inclination in the first stage is different from the inclination in the second stage following the first stage.

Those trajectory lines are stored preliminarily in the trajectory memorizing circuit SM. The trajectory is selected properly based on the value of the wire feeding speed setting signal Fr, which means also the average value of the welding current. Preferably, the trajectory is also selected based on welding methods, the welding speed, joints, base materials, and so on.

When the wire feeding speed, i.e. an average welding current, is low enough to allow short-circuiting transfer to occur, the trajectory line to be selected includes a small inclination at the first stage of the uprise period Tu and a large inclination at the second stage following the first stage, such as a curving line L11 or a broken line L12, is selected. With such selection, change of arc force become gradual, further restricting vibration of the molten pool, and thus preventing generation of spatter produced by vibration in the molten pool.

When the wire feeding speed, i.e. an average welding current, is high enough to allow globular transfer to occur, the trajectory line to be selected includes a large inclination at the first stage of the uprise period Tu and a small inclination at the second stage following the first stage, such as a curving line L21 or a broken line L22, is selected.

High wire feeding speed requires high wire melting speed because it needs a large welding current during an arc generating period. For this purpose, the inclination is set large at the first stage of the uprise period Tu in order to increase the welding current Iw rapidly and then turn wire melting speed high, whereas the inclination is set small at the second stage following the first stage in order to make change of arc force gradual.

With such selection, the welding condition becomes stable with high wire melting speed, in spite of achievement of restriction of the molten pool vibration, and thus prevention of spatter generation.

The above-mentioned first and the second embodiments may not be necessarily provided with the delay period Td as well as the conventional methods. The present invention may be applied to welding of steel, aluminum, stainless steel and so on. The present invention may also be applied to welding with spray transfer.

The invention claimed is:

1. A welding current controlling method in an arc welding process using a consumable electrode, the arc welding process including an alternate repetition of a short-circuiting state and an arc generating state occurring between the consumable electrode and a base material, the welding current controlling method comprising the steps of:

detecting a generation of a constriction in a molten droplet produced from the consumable electrode in the short-circuiting state, the detection being based on a change in one of a voltage or a resistance between the consumable electrode and the base material;

reducing sharply a welding current between the consumable electrode and the base material to a first current level upon detection of the constriction; and increasing the welding current from the first current level to a second current level higher than the first current level when an arc is generated between the consumable electrode and the base material with the welding current held at the first current level, the increasing of the welding current being started instantly upon generation of the arc or with a predetermined delay after the generation of the arc;

wherein the step of increasing the welding current from the first current level to the second current level comprises a first stage and a second stage following the first stage, the first stage being performed with a first inclination that gradually increases the welding current, the second stage being performed with a second inclination that gradually increases the welding current and is different from the first inclination.

2. The welding current controlling method according to claim 1, wherein the first inclination is smaller than the second when an average welding current falls in a range that allows short-circuiting transfer to occur.

3. The welding current controlling method according to claim 1, wherein the first inclination is greater than the second inclination when an average welding current falls in a range that allows globular transfer to occur.

* * * * *